US008932763B2

(12) United States Patent
Kim et al.

(10) Patent No.: US 8,932,763 B2
(45) Date of Patent: Jan. 13, 2015

(54) ANODE ACTIVE MATERIAL, NON-AQUEOUS LITHIUM SECONDARY BATTERY INCLUDING THE SAME, AND MANUFACTURING METHOD THEREOF

(75) Inventors: Young Jun Kim, Yongin-si (KR); Yong Nam Jo, Seoul (KR); Min Sik Park, Suwon-si (KR)

(73) Assignee: Korea Electronics Technology Institute, Seongnam-Si, Gyeonggi-Do (KR)

(*) Notice: Subject to any disclaimer, the term of this patent is extended or adjusted under 35 U.S.C. 154(b) by 12 days.

(21) Appl. No.: 13/819,073

(22) PCT Filed: Jun. 15, 2011

(86) PCT No.: PCT/KR2011/004389
§ 371 (c)(1),
(2), (4) Date: Feb. 26, 2013

(87) PCT Pub. No.: WO2012/036372
PCT Pub. Date: Mar. 22, 2012

(65) Prior Publication Data
US 2013/0157139 A1 Jun. 20, 2013

(30) Foreign Application Priority Data
Sep. 16, 2010 (KR) .................. 10-2010-0091296
May 4, 2011 (KR) .................. 10-2011-0042711

(51) Int. Cl.
*H01M 4/36* (2006.01)
*H01M 4/133* (2010.01)
*H01M 4/04* (2006.01)

(52) U.S. Cl.
CPC .............. *H01M 4/133* (2013.01); *H01M 4/366* (2013.01); *H01M 4/0471* (2013.01); *Y02E 60/122* (2013.01)
USPC ...................................................... 429/231.8

(58) Field of Classification Search
CPC ..... C08F 4/65916; C08F 2/28; Y02E 60/122; Y02E 60/521; H01L 21/76808; H01M 2004/00; H01M 2004/02; H01M 4/13; H01M 4/133; H01M 4/628; H01M 21/76808
USPC ............................ 429/231.8, 218.1, 223, 224
See application file for complete search history.

(56) References Cited

U.S. PATENT DOCUMENTS

2005/0207966 A1   9/2005  Zaghib
2010/0006449 A1*  1/2010  Tasaka .......................... 205/359

FOREIGN PATENT DOCUMENTS

JP     2002083602 A    3/2002
JP     2005123111      5/2005

(Continued)

OTHER PUBLICATIONS

International Search Report mailed Feb. 15, 2012 for PCT/KR2011/004389.

(Continued)

*Primary Examiner* — Mark F Huff
*Assistant Examiner* — Monique Wills
(74) *Attorney, Agent, or Firm* — Lowe Hauptman & Ham, LLP (57) ABSTRACT

The disclosure relates to an anode active material, a non-aqueous lithium secondary battery, and a manufacturing method thereof. The anode active material of this disclosure comprises a carbon-based material, and a coating film formed on the surface of the carbon-based material by performing heat treatment using an ammonia-based compound. The coating film may be formed on the surface of the carbon-based material through a thermal decomposition method using 10% or less by weight of the ammonia-based compound with respect to the carbon-based material. Since the surface of the carbon-based material is thermally treated using the ammonia-based compound, side reaction of the carbon-based material with an electrolyte at the surface thereof can be suppressed and structural stability can be enhanced, thereby improving battery lifespan and high-rate capability of a non-aqueous lithium secondary battery.

20 Claims, 3 Drawing Sheets

(56) References Cited

FOREIGN PATENT DOCUMENTS

| KR | 1020060133615 | 12/2006 |
| KR | 1020080099132 | 11/2008 |
| KR | 1020100007236 | 1/2010 |

OTHER PUBLICATIONS

Korean Office Action for application No. 10-2011-0042711 dated Aug. 31, 2012.

* cited by examiner

ANODE ACTIVE MATERIAL, NON-AQUEOUS LITHIUM SECONDARY BATTERY INCLUDING THE SAME, AND MANUFACTURING METHOD THEREOF

TECHNICAL FIELD

The present invention relates to a non-aqueous lithium secondary battery and a manufacturing method thereof, and more particularly, to an anode active material, a non-aqueous lithium secondary battery including the same, and a manufacturing method thereof to thermally treat the surface of a carbon-based material used as the anode active material of the lithium secondary battery through thermal decomposition of an ammonia-based compound to suppress side reaction of the carbon-based material with an electrolyte at the surface thereof and enhance structural stability, thereby improving battery lifespan and high-rate capability of the non-aqueous lithium secondary battery.

BACKGROUND ART

As portable small electric/electronic devices are widely propagated, new secondary batteries such as a nickel metal hydride battery and a lithium secondary battery are actively being developed.

The lithium secondary battery uses metal lithium as an anode active material and a non-aqueous solvent as an electrolyte. Lithium can generate a high voltage because it has considerable ionization tendency, and thus a battery having a high energy density using lithium is under development. The lithium secondary battery using metal lithium as an anode active material has been used as a next-generation battery for a long time.

However, the lithium secondary battery has a short life cycle because lithium dendrites grow from the anode and penetrate an insulating membrane as charging and discharging of the lithium secondary battery are repeated, resulting in short-circuit with the cathode, causing battery failure.

To solve the problem that the life cycle of the lithium secondary battery is reduced due to anode deterioration, a method of using a carbon-based material capable of intercalating/deintercalating lithium ions instead of metal lithium as an anode active material was proposed.

In a lithium secondary battery having an anode formed using a carbon-based material, the lithium ions are intercalated into carbon according to reaction at the cathode during charging/discharging. Electrons are transferred to a carbonaceous material of the anode and thus carbon is negatively charged to deintercalate the lithium ions from the cathode and intercalate the lithium ions into the carbonaceous material of the anode during charging, whereas the lithium ions are deintercalated from the carbonaceous material of the anode and intercalated into the cathode during discharging. Using this mechanism, precipitation of metal lithium at the anode can be prevented to achieve a lithium secondary battery having a considerably long life cycle.

The lithium secondary battery using a carbon-based material as an anode active material is called a lithium ion secondary battery and has been widely propagated as a battery of portable electronic/communication devices. However, when a carbon-based material is used as an anode active material, the charge/discharge potential of lithium is lower than the stable range of a conventional non-aqueous electrolyte, and thus decomposition of electrolyte occurs during charging/discharging, causing low initial charging/discharging (coulombic) efficiency of the current lithium secondary battery using a carbon-based material as an anode material, short battery lifespan, and deterioration of high rate capability. Accordingly, methods for stabilizing the surface of a carbon-based anode active material using an electrolyte additive having a decomposition potential higher than that of a carbonate-based electrolyte, such as VC (vinylene carbonate), FEC (fluoroethylene carbonate), etc. are proposed in order to increase the lifespan of a non-aqueous lithium secondary battery using a carbon-based material.

However, the electrolyte additive cannot solve the problems of high rate capability and charging/discharging efficiency deterioration although it increases the lifespan of the lithium secondary battery.

DETAILED DESCRIPTION OF THE INVENTION

Technical Problems

An object of the present invention is to provide an anode active material surface-treated with an ammonia-based compound, a non-aqueous lithium secondary battery including the same, and a manufacturing method thereof to enhance the surface of a carbon-based material without using an electrolyte additive and improve reactivity and structural stability of the surface, thereby improving battery lifespan without deteriorating charging/discharging (coulombic) efficiency and high rate capability when the carbon-based material is used as an anode active material of the non-aqueous lithium secondary battery.

Technical Solutions

The object of the present invention can be achieved by providing an anode active material for use in a non-aqueous lithium secondary battery and a manufacturing method thereof to thermally treat the surface of a carbon-based material used as the anode active material of the lithium secondary battery through thermal decomposition of an ammonia-based compound.

According to an aspect of the present invention, an anode active material for use in a non-aqueous lithium secondary battery includes a carbon-based material, and a coating film formed on the surface of the carbon-based material through heat treatment using an ammonia-based compound. The ammonia-based compound is expressed by a chemical formula of $(NH_4)xMyNz$ where M is B, P, Al, N, S, Mo, Mn, Pt or Cr, N is F, O, Cl or I, $1 \leq x \leq 3$, $0 \leq y \leq 2$ and $1 \leq z \leq 8$ (x, y and z being integers).

The coating film may be formed through the heat treatment of a thermal decomposition method using 10% or less by weight of the ammonia-based compound with respect to the carbon-based material.

The coating film may be uniformly formed or partially formed on the surface of the carbon-based material.

The ammonia-based compound may be $NH_4F$, $NH_4BF_4$, $NH_4PF_6$, $NH_4AlF_6$, $NH_4NO_2$, $NH_4NO_3$, $NH_4ClO_3$, $NH_4ClO_4$, $(NH_4)_2SO_3$, $(NH_4)_2SO_4$, $(NH_4)_2CO_3$, $(NH_4)_2MoO_4$, $(NH_4)_2PO_4$, $NH_4PO_3$, $NH_4MnO_4$, $(NH_4)_2Cr_2O_7$, $NH_4SO_4$, $(NH_4)_2MnSO_4$, $(NH_4)_2S_2O_8$, $NH_42Cl$, $(NH_4)PtCl_6$ or $NH_4I$.

The carbon-based material may include at least one of artificial graphite, natural graphite, graphitized carbon fiber, graphitized mesocarbon microbeads, petroleum coke, plastic resins, carbon fiber and pyrocarbon.

According to another aspect of the present invention, there is provided a lithium secondary battery including an anode having the anode active material.

According to another aspect of the present invention, a method for manufacturing an anode active material for use in a non-aqueous lithium secondary battery includes preparing a carbon-based material and an ammonia-based compound, and forming a coating film on the surface of the carbon-based material using the ammonia-based compound.

The forming of the coating film may include dissolving the carbon-based material and the ammonia-based compound in a solvent to form a solution, uniformly mixing the carbon-based material and the ammonia-based compound in the solution; vacuum-drying the solution, and performing heat treatment on the dried material through thermal decomposition to form the coating film based on the ammonia-based compound on the surface of the carbon-based material.

The forming of the coating film may include dissolving the ammonia-based compound in a solvent to form a solution, injecting the solution into the carbon-based material, and performing heat treatment on the carbon-based material into which the solution has been injected to form the coating film based on the ammonia-based compound on the surface of the carbon-based material.

The forming of the coating film may include mixing powders of the carbon-based material and the ammonia-based compound, and performing heat treatment on the mixed powders of the carbon-based material and the ammonia-based compound to form the coating film based on the ammonia-based compound on the surface of the carbon-based material.

Ammonia contained in the ammonia-based compound may be removed through the heat treatment, and other inorganic materials may form the coating film on the surface of the carbon-based material during heat treatment as a result of the decomposition of the ammonia-based compound.

The heat treatment may be performed at a temperature in the range of 200 to 3000° C. for one hour or longer.

Advantageous Effects

According to the present invention, the surface of a carbon-based material used as an anode active material of a non-aqueous lithium secondary battery can be treated through thermal decomposition using an ammonia-based compound to form a coating film thereon, thereby suppressing a side reaction of the carbon-based material and forming more stable solid electrolyte interphase (SEI) at the surface thereof during charging/discharging according to the coating film formed on the carbon-based material and enhancing structural stability.

Furthermore, affinity of the anode active material with the electrolyte can be improved so as to enhance battery lifespan and high rate capability of the non-aqueous lithium secondary battery.

In addition, manufacturing efficiency of the anode active material can be improved according to a simple surface treatment process.

MODE FOR CARRYING OUT THE INVENTION

Embodiments of the present invention will be described in detail with reference to the attached drawings.

An anode active material of a non-aqueous lithium secondary battery according to an embodiment of the present invention includes a carbon-based material and a coating film formed on the surface of the carbon-based material through thermal decomposition using an ammonia-based compound.

The carbon-based material may use at least one of amorphous carbon materials such as artificial graphite, natural graphite, graphitized carbon fiber, graphitized mesocarbon microbeads, petroleum coke, plastic resins, carbon fiber, pyrocarbon, etc.

The coating film can be formed by thermally treating the surface of the carbon-based material through thermal decomposition using 10% or less by weight of the ammonia-based compound with respect to the carbon-based material. That is, during a process of thermally treating the surface of the carbon-based material through thermal decomposition of the ammonia-based compound, ammonia contained in the ammonia-based compound is removed, and other inorganic materials form the coating film on surface of the carbon-based material as a result of decomposition of ammonia-based compound. The ammonia-based compound can be expressed by the following chemical formula 1.

[Chemical formula 1]

In chemical formula 1, M is B, P, Al, N, S, Mo, Mn, Pt or Cr, and N is F, O, Cl or I, $1 \leq x \leq 3$, $0 \leq y \leq 2$ and $1 \leq z \leq 8$ (x, y and z being integers).

For example, the ammonia-based compound can be $NH_4F$, $NH_4BF_4$, $NH_4PF_6$, $NH_4AlF_6$, $NH_4NO_2$, $NH_4NO_3$, $NH_4ClO_3$, $NH_4ClO_4$, $(NH_4)_2SO_3$, $(NH_4)_2SO_4$, $(NH_4)_2CO_3$, $(NH_4)_2MoO_4$, $(NH_4)_2PO_4$, $NH_4PO_3$, $NH_4MnO_4$, $(NH_4)_2Cr_2O_7$, $NH_4SO_4$, $(NH_4)_2MnSO_4$, $(NH_4)_2S_2O_8$, $NH_{42}Cl$, $(NH_4)PtCl_6$ or $NH_4I$. However, the ammonia-based compound is not limited thereto.

Here, the coating film may be uniformly formed on the overall surface of the carbon-based material or only on part of the surface of the carbon-based material according to the quantity of the ammonia-based compound.

In this manner, the surface of the carbon-based material used as the anode active material is thermally treated using the ammonia-based compound to form the coating film thereon, and thus side reaction of the carbon-based material at the surface thereof can be suppressed and surface stability can be enhanced, thereby improving battery lifespan and high rate capability of the lithium secondary battery manufactured using the anode active material according to the present invention.

Figure 1:
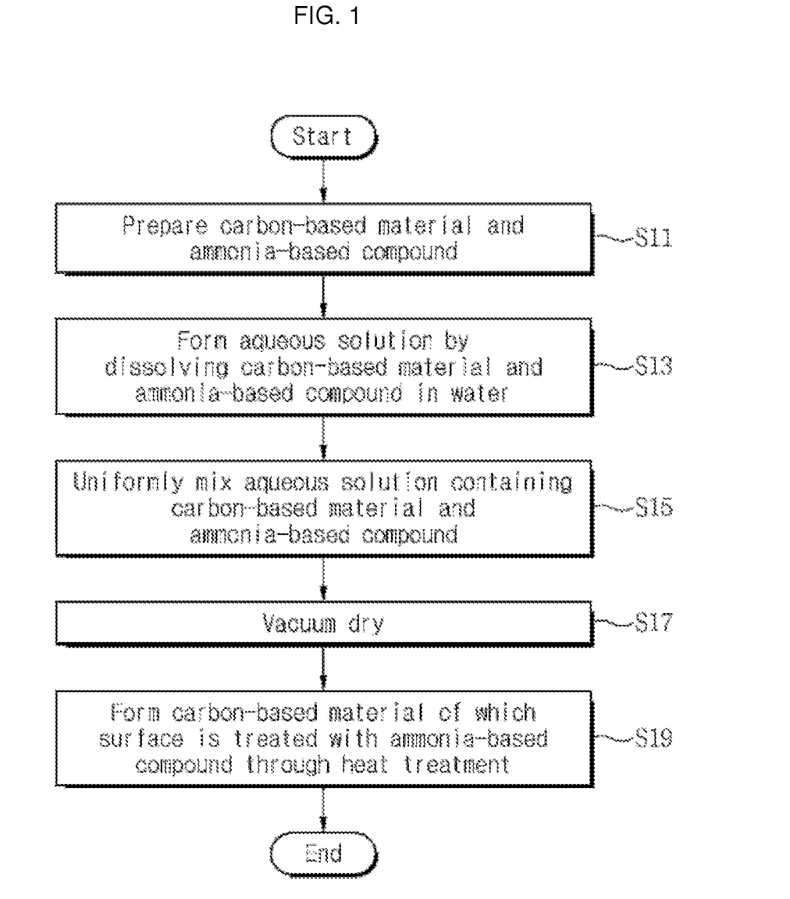
FIG. 1 is a flowchart illustrating a method of manufacturing a non-aqueous lithium secondary battery anode active material surface-treated with an ammonia-based compound according to an embodiment of the present invention.

A method of manufacturing the anode active material of the non-aqueous lithium secondary battery, which is surface-treated with the ammonia-based compound, according to the present invention will now be described with reference to FIG. 1. FIG. 1 is a flowchart illustrating the method of manufacturing the non-aqueous lithium secondary battery anode active material surface-treated with the ammonia-based compound according to an embodiment of the present invention.

Referring to FIG. 1, the method of manufacturing the anode active material according to the present invention includes a step (S11) of preparing the carbon-based material and the ammonia-based compound and steps (S13 to S19) of forming the coating film on the surface of the carbon-based material using the ammonia-based compound.

Specifically, the carbon-based material and the ammonia-based compound are prepared in step S11. Here, a material having a mean particle size of less than 15 μm may be used as the carbon-based material and a compound expressed by chemical formula 1 can be used as the ammonia-based compound.

The carbon-based material and the ammonia-based compound are dissolved in water to form an aqueous solution in step S13. Here, while water is used as a solvent in the present embodiment, an organic solvent such as alcohol can be used.

The carbon-based material and the ammonia-based compound in the aqueous solution are uniformly mixed in step S15. Step S15 may be performed for about 15 minutes.

The aqueous solution is vacuum-dried in step S17. Vacuum drying may be performed at 120° C. for 6 to 12 hours.

The material dried in step S17 is heat-treated through thermal decomposition in step S19 to form the anode active material corresponding to the carbon-based material surface-treaded with the ammonia-based compound according to the present invention. That is, during the process of thermally treating the ammonia-based compound through thermal decomposition, ammonia contained in the ammonia-based compound is removed and other inorganic materials form the coating film on the surface of the carbon-based material. Heat treatment in step S19 may be performed in an inert gas atmosphere at a temperature in the range of 200 to 3000° C. for 1 hour or longer. For example, heat treatment can be performed in an Ar or $N_2$ atmosphere at a heating rate of 10° C./min.

While the aqueous solution of the carbon-based material and the ammonia-based compound is formed, vacuum-dried and heat-treated to form the coating film of the surface of the carbon-based material through steps S13 to S19 in the present embodiment of the invention, the present invention is not limited thereto. For example, it is possible to dissolve the ammonia-based compound in a solvent to form a solution, inject the solution into the carbon-based material, and then heat-treat the carbon-based material into which the solution has been injected to form the coating film on the surface of the carbon-based material. Otherwise, it is possible to mix powders of the carbon-based material and the ammonia-based compound and heat-treat the mixed powders to form the coating film on the surface of the carbon-based material. That is, the coating film is formed on the surface of the carbon-based material through a dry method. While heat treatment is performed in an inert gas atmosphere in the present embodiment, heat treatment may be carried out in a vacuum or oxidizing atmosphere.

To evaluate the life and high rate capability of the non-aqueous lithium secondary battery using the anode active material according to the present invention, non-aqueous lithium secondary batteries according to embodiments and a comparative example were manufactured as follows. In the embodiments, a carbon-based material surface-treated with an ammonia-based compound is used as the anode active material. In the comparative example, a carbon-based material that is not surface-treated with an ammonia-based compound is used as the anode active material. The non-aqueous lithium secondary batteries according to the embodiments and the comparative example are manufactured in the same manner, excepting the anode active materials, and thus description is focused on the method of manufacturing the non-aqueous lithium secondary battery according to the embodiment.

A slurry is formed using 96 wt % of an anode active material, 2 wt % of conducting material Super-P, 2 wt % of binding agent SBR and viscosity agent CMC (carboxymethyl cellulose), and water as a solvent. This slurry is coated on Cu foil having a thickness of 20 μm, dried, consolidated using a press, and then dried in vacuum at 120° C. for 16 hours, to manufacture an electrode in the form of a circular plate having a diameter of 12 mm. Punched lithium metal foil having a diameter of 12 mm is used as a counter electrode, and a PP film is used as a membrane. A mixed solution of $LiPF_6$ of 1 M and EC/DME mixed in a ratio of 3:7 is used as an electrolyte. After the electrolyte is impregnated into the membrane, the membrane is inserted between the electrode and the counter electrode and set in a SUS case, achieving a test cell for electrode evaluation, that is, the non-aqueous lithium secondary battery.

The carbon-based material can be at least one of amorphous carbon materials such as artificial graphite, natural graphite, graphitized carbon fiber, graphitized mesocarbon microbeads, petroleum coke, plastic resins, carbon fiber, pyrocarbon, etc.

The ammonia-based compound can be $NH_4F$, $NH_4BF_4$, $NH_4PF_6$, $NH_4AlF_6$, $NH_4NO_2$, $NH_4NO_3$, $NH_4ClO_3$, $NH_4ClO_4$, $(NH_4)_2SO_3$, $(NH_4)_2SO_4$, $(NH_4)_2CO_3$, $(NH_4)_2MoO_4$, $(NH_4)_2PO_4$, $NH_4PO_3$, $NH_4MnO_4$, $(NH_4)_2Cr_2O_7$, $NH_4SO_4$, $(NH_4)_2MnSO_4$, $(NH_4)_2S_2O_8$, $NH_{42}Cl$, $(NH_4)PtCl_6$ or $NH_4I$. However, the ammonia-based compound is not limited thereto.

The carbon-based material surface-treated with the ammonia-based compound can be used as an anode active material of a non-aqueous lithium secondary battery using a carbonate electrolyte. Furthermore, the carbon-based anode active material surface-treated with the ammonia-based compound can be applied to a lithium secondary battery having a non-aqueous electrolyte operating in a voltage range of 0V to 5V.

An anode plate is manufactured by adding a conducting material, a binding agent, a filler, a dispersing agent, an ion conducting material, a pressure increasing agent, and one or more generally used additive components to powder of the anode active material surface-treated with the ammonia-based compound as necessary, to form a slurry or paste. The slurry or paste is coated on an electrode support plate using doctor blade method, for example, dried, and then pressed with a rolling roll, to manufacture the anode plate.

Here, graphite, carbon black, acetylene black, Ketjen black, carbon fiber, metal powder, etc. may be used as the conductive material. PVdF, polyethylene, etc. may be used as the binding agent. The anode plate (also referred to as a current collector) may be formed of copper, nickel, stainless steel or aluminum foil or sheet, or carbon fiber, etc.

The lithium secondary battery is manufactured using the anode formed as above. The lithium secondary battery may have any of coin, button, sheet, cylindrical, and rectangular shapes. The anode, electrolyte and membrane of the lithium secondary battery use those of conventional lithium secondary batteries.

A cathode active material includes a material reversibly capable of intercalating and deintercalating lithium ions. A lithium-transition metal oxide such as $iCoO_2$, $LiNiO_2$, $LiMnO_2$ or $LiNi1-x-yCoxMy_02$ ($0 \leq x \leq 1$, $0 \leq y \leq 1$, $0 \leq x+y \leq 1$, M being metal such as Al, Sr, Mg, La, etc.) may be used as the cathode active material. Otherwise, one or more of the above cathode active materials can be used. The above-mentioned cathode active material is exemplary and the present invention is not limited thereto.

The electrolyte may use a non-aqueous electrolyte containing lithium carbonate dissolved in an organic solvent, an inorganic solid electrolyte, an inorganic solid electrolyte compound, etc. However, the present invention is not limited thereto.

Here, carbonate, ester, ether or ketone may be used as a solvent of the non-aqueous electrolyte. Dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), etc. may be used as the carbonate. Butyrolactone (BL), decanolide, valerolactone, mevalonolactone, caprolactone, n-methyl acetate, n-ethyl acetate, n-propyl acetate, etc. may be used as the ester. Dibutyl ether may be used as the ether. Polymethylvinyl ketone may be used as the ketone. The non-aqueous electrolyte according to the present invention is not limited to non-aqueous organic solvents.

Examples of the lithium carbonate of the non-aqueous electrolyte include one or more of $LiPF_6$, $LiBF_4$, $LiSbF_6$, $LiAsF_6$, $LiCiO_4$, $LiCF_3SO_3$, $LiN(CF_3SO_2)_2$, $LiN(C_2F_5SO_2)_2$, $LiAlO_4$, $LiAlCl_4$, $LiN(C_xF_{2x+1}SO_2)(C_yF_{2x+1}SO_2)$ (x and y being natural numbers) and $LiSO_3CF_3$, or a mixture thereof.

A porous film formed from polyolefin such as PP (polypropylene) or PE (polyethylene) or a porous material such as non-woven fabric may be used as the membrane.

Embodiments and Comparative Example

In the comparative example, natural graphite having a mean particle size of less than 15 μm was used as the carbon-based material that is not surface-treated using the ammonia-based material for the anode active material.

In embodiment 1, natural graphite having a mean particle size of less than 15 μm, which has been surface-treated using 3 wt % of $NH_4F$ in an Ar ambient at 400° C., was used as the anode active material.

In embodiment 2, natural graphite having a mean particle size of less than 15 μm, which has been surface-treated using 3 wt % of $NH_4BF_4$ in an Ar atmosphere at 400° C., was used as the anode active material.

In embodiment 3, natural graphite having a mean particle size of less than 15 μm, which has been surface-treated using 3 wt % of $NH_4PF_6$ in an Ar atmosphere at 400° C., was used as the anode active material.

In embodiment 4, natural graphite having a mean particle size of less than 15 μm, which has been surface-treated using 3 wt % of $NH_4SO_4$ in an Ar atmosphere at 400° C., was used as the anode active material.

In embodiment 5, natural graphite having a mean particle size of less than 15 μm, 1, which has been surface-treated using 3 wt % of $NH_4PF_4$ in an Ar atmosphere at 800° C., was used as the anode active material.

In embodiment 6, natural graphite having a mean particle size of less than 15 μm, which has been surface-treated using 3 wt % of $NH_4SO_4$ in an Ar atmosphere at 800° C., was used as the anode active material.

The anode active materials according to the comparative example and embodiments 1 to 6 are arranged as shown in Table 1.

TABLE 1

|  | Carbon-based material | Surface treatment source | Surface treatment quantity (wt %) | Surface treatment temperature (° C.) |
| --- | --- | --- | --- | --- |
| Comparative example | Natural graphite (~15 μm) | — | 0 | — |
| Embodiment 1 | Natural graphite (~15 μm) | $NH_4F$ | 3 | 300 |
| Embodiment 2 | Natural graphite (~15 μm) | $NH_4BF_4$ | 3 | 400 |
| Embodiment 3 | Natural graphite (~15 μm) | $NH_4PF_6$ | 3 | 400 |
| Embodiment 4 | Natural graphite (~15 μm) | $NH_4SO_4$ | 3 | 400 |
| Embodiment 5 | Natural graphite (~15 μm) | $NH_4PF_6$ | 3 | 800 |
| Embodiment 6 | Natural graphite (~15 μm) | $NH_4SO_4$ | 3 | 800 |

Figure 2:
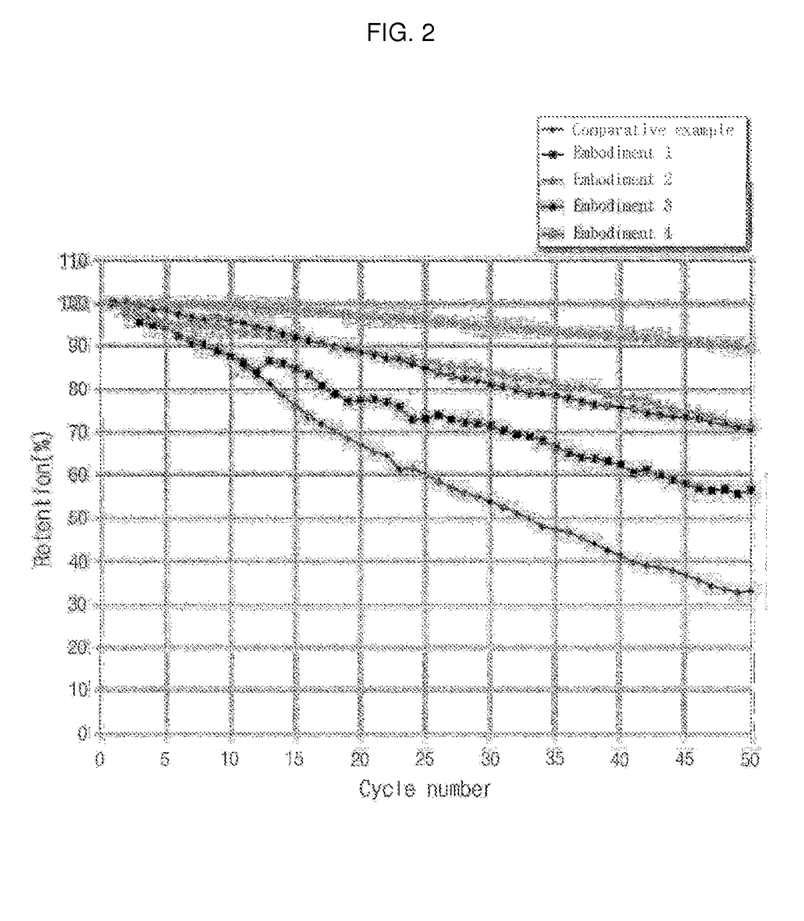
FIGS. 2 and 3 are graphs showing lifespan of the non-aqueous lithium secondary battery with respect to a surface treatment temperature of the anode active material according to embodiments and comparative examples of the present invention.
Figure 3:
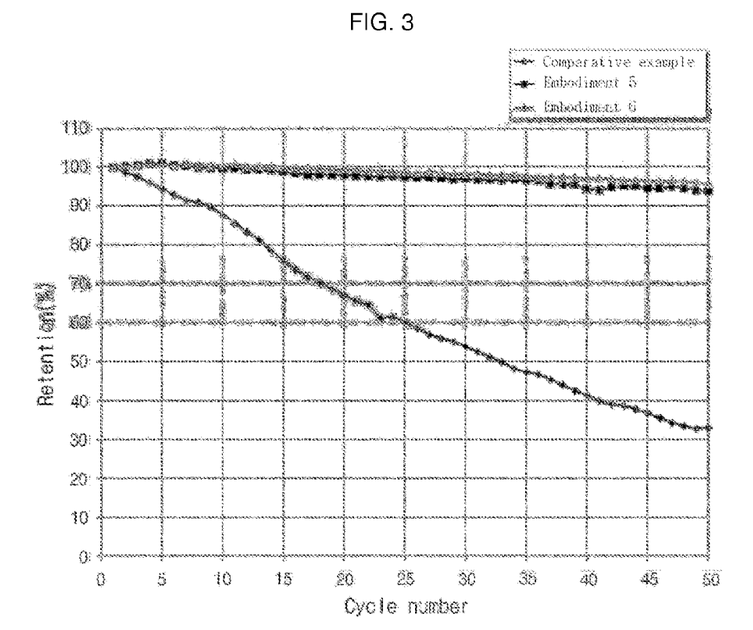

To check the influence of the type and treatment temperature of the ammonia-based compound on the lifespan of the non-aqueous lithium secondary battery, the following test was performed using non-aqueous lithium secondary batteries to which the anode active materials according to the comparative example of embodiments 1 to 6 were applied. 3 cycles of charging/discharging of the non-aqueous lithium secondary batteries to which the anode active materials according to the comparative example and embodiments 1 to 6 are applied were performed using current of 0.2 C (72 mA/g), and then 50 cycles of charging/discharging were carried out using current of 0.5 C (180 mA/g). The test results are shown in FIGS. 2 and 3. As can be confirmed from FIGS. 2 and 3, the non-aqueous lithium secondary batteries having the anode active materials surface-treated with the ammonia-based compound according to embodiments 1 to 6 have a longer lifespan than that of the comparative example.

In addition, it can be known from FIGS. 2 and 3 that battery lifespan increases as the surface treatment temperature increases.

Figure 4:
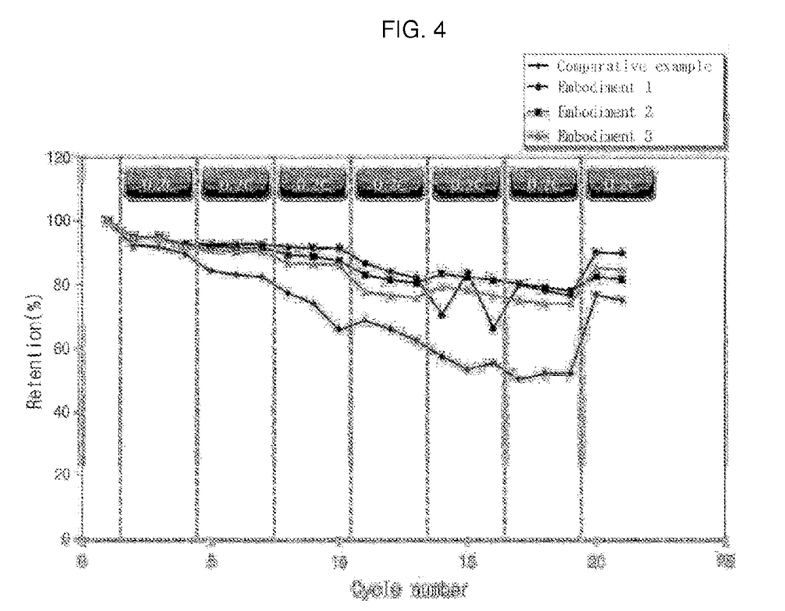
FIG. 4 is a graph showing high rate capability of the non-aqueous lithium secondary battery according to an embodiment and a comparative example of the present invention.

To check the influence of the type of the ammonia-based compound on high rate capability of the non-aqueous lithium secondary batteries, the following test was performed using the non-aqueous lithium secondary batteries to which the anode active materials according to the comparative example of embodiments 1 to 6 were applied. 1-cycle charging/discharging of the non-aqueous lithium secondary batteries to which the anode active materials according to the comparative example and embodiments 1 to 3 were applied was performed. Then, charging is performed with fixed current of 0.5 C (180 mA/g) and charging cycles are respectively performed for 3 seconds using 0.2 C (72 mA/g), 0.5 C (180 mA/g), 1 C (360 mA/g), 2 C (720 mA/g), 3 C (1080 mA/g) and 5 C (1800 mA/g). Subsequently, 2 cycles of charging/discharging are performed using 0.2 C (72 mA/g). The test results are shown in FIG. 4. As can be confirmed from FIG. 4, high rate capability is improved after surface treatment.

The above-described test results show that the coating film formed on the natural graphite by treating the surface of the natural graphite using the ammonia-based compound effectively suppresses side reaction due to direct contact with the electrolyte and promotes forming more stable solid electrolyte interphase (SEI) during charging/discharging, thereby enhancing structural stability of the surface of the natural graphite and improving battery lifespan and output characteristic of the non-aqueous lithium secondary battery to which the anode active material surface-treated with the ammonia-based compound is applied.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims.

What is claimed is:

1. A method for manufacturing an anode active material for use in a non-aqueous lithium secondary battery, the method comprising:
preparing a carbon-based material and an ammonia-based compound; and
forming a coating film on the surface of the carbon-based material using the ammonia-based compound,
wherein the ammonia-based compound is expressed by a chemical formula of $(NH_4)xMyNz$
where
M is B, P, Al, N, S, Mo, Mn, Pt or Cr,
N is F, O, Cl or I,
$1 \leq x \leq 3$, $0 \leq y \leq 2$, and
$1 \leq z \leq 8$ (x, y and z being integers),
wherein the forming of the coating film comprises:
dissolving the carbon-based material and the ammonia-based compound in a solvent to form a solution;
uniformly mixing the carbon-based material and the ammonia-based compound in the solution;
vacuum-drying the solution; and
performing heat treatment on the dried material through thermal decomposition to form the coating film based on the ammonia-based compound on the surface of the carbon-based material.

2. The anode active material of claim 1, wherein the preparing comprises preparing the ammonia-based compound to be 10% or less by weight of the carbon-based material.

3. The anode active material of claim 1, wherein the forming the coating film comprises forming the coating film partially on the surface of the carbon-based material.

4. The anode active material of claim 1, wherein the ammonia-based compound is at least one of $NH_4F$, $NH_4BF_4$, $NH_4PF_6$, $NH_4AlF_6$, $NH_4NO_2$, $NH_4NO_3$, $NH_4ClO_3$, $NH_4ClO_4$, $(NH_4)_2SO_3$, $(NH_4)_2SO_4$, $(NH_4)_2CO_3$, $(NH_4)_2MoO_4$, $(NH_4)_2PO_4$, $NH_4PO_3$, $NH_4MnO_4$, $(NH_4)_2Cr_2O_7$, $NH_4SO_4$, $(NH_4)_2MnSO_4$, $(NH_4)_2S_2O_8$, $NH_{42}Cl$, $(NH_4)PtCl_6$ or $NH_4I$.

5. The anode active material of claim 1, wherein the carbon-based material includes at least one of artificial graphite, natural graphite, graphitized carbon fiber, graphitized mesocarbon microbeads, petroleum coke, plastic resins, carbon fiber or pyrocarbon.

6. A method for manufacturing an anode active material for use in a non-aqueous lithium secondary battery, the method comprising:
preparing a carbon-based material and an ammonia-based compound; and
forming a coating film on the surface of the carbon-based material using the ammonia-based compound,
wherein the ammonia-based compound is expressed by a chemical formula of $(NH_4)xMyNz$
where
M is B, P, Al, N, S, Mo, Mn, Pt or Cr,
N is F, O, Cl or I,
$1 \leq x \leq 3$, $0 \leq y \leq 2$, and
$1 \leq z \leq 8$ (x, y and z being integers),
wherein the forming of the coating film comprises:
dissolving the ammonia-based compound in a solvent to form a solution;
injecting the solution into the carbon-based material;
mixing the injected solution including the ammonia-based compound and the carbon-based material; and
performing heat treatment on the mixed carbon-based material and the solution to form the coating film based on the ammonia-based compound on the surface of the carbon-based material.

7. A method for manufacturing an anode active material for use in a non-aqueous lithium secondary battery, the method comprising:
preparing a carbon-based material and an ammonia-based compound; and
forming a coating film on the surface of the carbon-based material using the ammonia-based compound,
wherein the ammonia-based compound is expressed by a chemical formula of $(NH_4)xMyNz$
where
M is B, P, Al, N, S, Mo, Mn, Pt or Cr,
N is F, O, Cl or I,
$1 \leq x \leq 3$, $0 \leq y \leq 2$, and
$1 \leq z \leq 8$ (x, y and z being integers),
wherein the forming of the coating film comprises:
mixing powders of the carbon-based material and the ammonia-based compound; and
performing heat treatment on the mixed powders of the carbon-based material and the ammonia-based compound to form the coating film based on the ammonia-based compound on the surface of the carbon-based material.

8. The method of claim 1, wherein ammonia contained in the ammonia-based compound is removed through the heat treatment, and other inorganic materials form the coating film on the surface of the carbon-based material during heat treatment as a result of the decomposition of the ammonia-based compound.

9. The method of claim 8, wherein the heat treatment is performed at a temperature in the range of 200 to 3000° C. for one hour or longer.

10. The anode active material of claim 1, wherein forming the coating film comprises forming the coating film uniformly on the surface of the carbon-based material.

11. The anode active material of claim 6, wherein the preparing comprises preparing the ammonia-based compound being 10% or less by weight of the carbon-based material.

12. The anode active material of claim 6, wherein the ammonia-based compound is at least one of $NH_4F$, $NH_4BF_4$, $NH_4PF_6$, $NH_4AlF_6$, $NH_4NO_2$, $NH_4NO_3$, $NH_4ClO_3$, $NH_4ClO_4$, $(NH_4)_2SO_3$, $(NH_4)_2SO_4$, $(NH_4)_2CO_3$, $(NH_4)_2MoO_4$, $(NH_4)_2PO_4$, $NH_4PO_3$, $NH_4MnO_4$, $(NH_4)_2Cr_2O_7$, $NH_4SO_4$, $(NH_4)_2MnSO_4$, $(NH_4)_2S_2O_8$, $NH_{42}Cl$, $(NH_4)PtCl_6$ or $NH_4I$.

13. The anode active material of claim 6, wherein the carbon-based material includes at least one of artificial graphite, natural graphite, graphitized carbon fiber, graphitized mesocarbon microbeads, petroleum coke, plastic resins, carbon fiber or pyrocarbon.

14. The method of claim 6, wherein ammonia contained in the ammonia-based compound is removed through the heat treatment, and other inorganic materials form the coating film on the surface of the carbon-based material during heat treatment as a result of the decomposition of the ammonia-based compound.

15. The method of claim 14, wherein the heat treatment is performed at a temperature in the range of 200 to 3000° C. for one hour or longer.

16. The anode active material of claim 7, wherein the preparing comprises preparing the ammonia-based compound being 10% or less by weight of the carbon-based material.

17. The anode active material of claim 7, wherein the ammonia-based compound is at least one of $NH_4F$, $NH_4BF_4$, $NH_4PF_6$, $NH_4AlF_6$, $NH_4NO_2$, $NH_4NO_3$, $NH_4ClO_3$, $NH_4ClO_4$, $(NH_4)_2SO_3$, $(NH_4)_2SO_4$, $(NH_4)_2CO_3$, $(NH_4)_2MoO_4$, $(NH_4)_2PO_4$, $NH_4PO_3$, $NH_4MnO_4$, $(NH_4)_2Cr_2O_7$, $NH_4SO_4$, $(NH_4)_2MnSO_4$, $(NH_4)_2S_2O_8$, $NH_42Cl$, $(NH_4)PtCl_6$ or $NH_4I$.

18. The anode active material of claim 7, wherein the carbon-based material includes at least one of artificial graphite, natural graphite, graphitized carbon fiber, graphitized mesocarbon microbeads, petroleum coke, plastic resins, carbon fiber or pyrocarbon.

19. The method of claim 7, wherein ammonia contained in the ammonia-based compound is removed through the heat treatment, and other inorganic materials form the coating film on the surface of the carbon-based material during heat treatment as a result of the decomposition of the ammonia-based compound.

20. The method of claim 7, wherein the heat treatment is performed at a temperature in the range of 200 to 3000° C. for one hour or longer.

\* \* \* \* \*